United States Patent [19]

Rodgers

[11] Patent Number: 4,628,696
[45] Date of Patent: Dec. 16, 1986

[54] HEAT GENERATING SYSTEM AND METHOD

[75] Inventor: Steven S. Rodgers, Hudson, N.Y.

[73] Assignee: Lord & Sons, Inc., Del Haven, N.J.

[21] Appl. No.: 617,588

[22] Filed: Jun. 5, 1984

Related U.S. Application Data

[63] Continuation-in-part of Ser. No. 385,961, Jun. 7, 1982, abandoned.

[51] Int. Cl.⁴ ................................................ F25B 7/00
[52] U.S. Cl. .......................................... 62/79; 62/225; 237/2 B
[58] Field of Search ...................... 62/79, 225; 237/2 B

[56] References Cited

U.S. PATENT DOCUMENTS

| | | | |
|---|---|---|---|
| 3,640,086 | 2/1972 | Brody | 62/225 X |
| 3,688,516 | 9/1972 | Newton | 62/225 X |
| 4,055,963 | 11/1977 | Shoji et al. | 237/2 B X |
| 4,179,894 | 12/1979 | Hughes | 237/2 B X |
| 4,330,309 | 5/1982 | Robinson, Jr. | 237/2 B X |
| 4,333,317 | 6/1982 | Sawyer | 62/225 X |
| 4,375,831 | 3/1983 | Downing, Jr. | 237/2 B X |
| 4,474,018 | 10/1984 | Teagan | 237/2 B X |

*Primary Examiner*—Lloyd L. King
*Attorney, Agent, or Firm*—Neil F. Markva

[57] ABSTRACT

A self contained heating system comprises a closed circuit containing a refrigerant. The closed circuit includes a heat exchange portion, a condensing portion, an evaporator portion and a compressing portion. Superheated, evaporated gas is introduced into the compressing zone to raise the temperature of the evaporated gas discharged therefrom and introduced back into the heat exchange portion. The amount of heat energy contained by the refrigerant is increased while it is in a heat transfer zone. The additional heat energy is released from the refrigerant in a condensing zone. A smaller volume of evaporated gas is exposed to the higher heat being transferred from the condensing zone and is saturated with the heat energy within the evaporator zone before being directed to the inlet side of the compressor. The heat generating system does not require drawing any heat from any other source outside the heat generating system of this invention.

58 Claims, 7 Drawing Figures

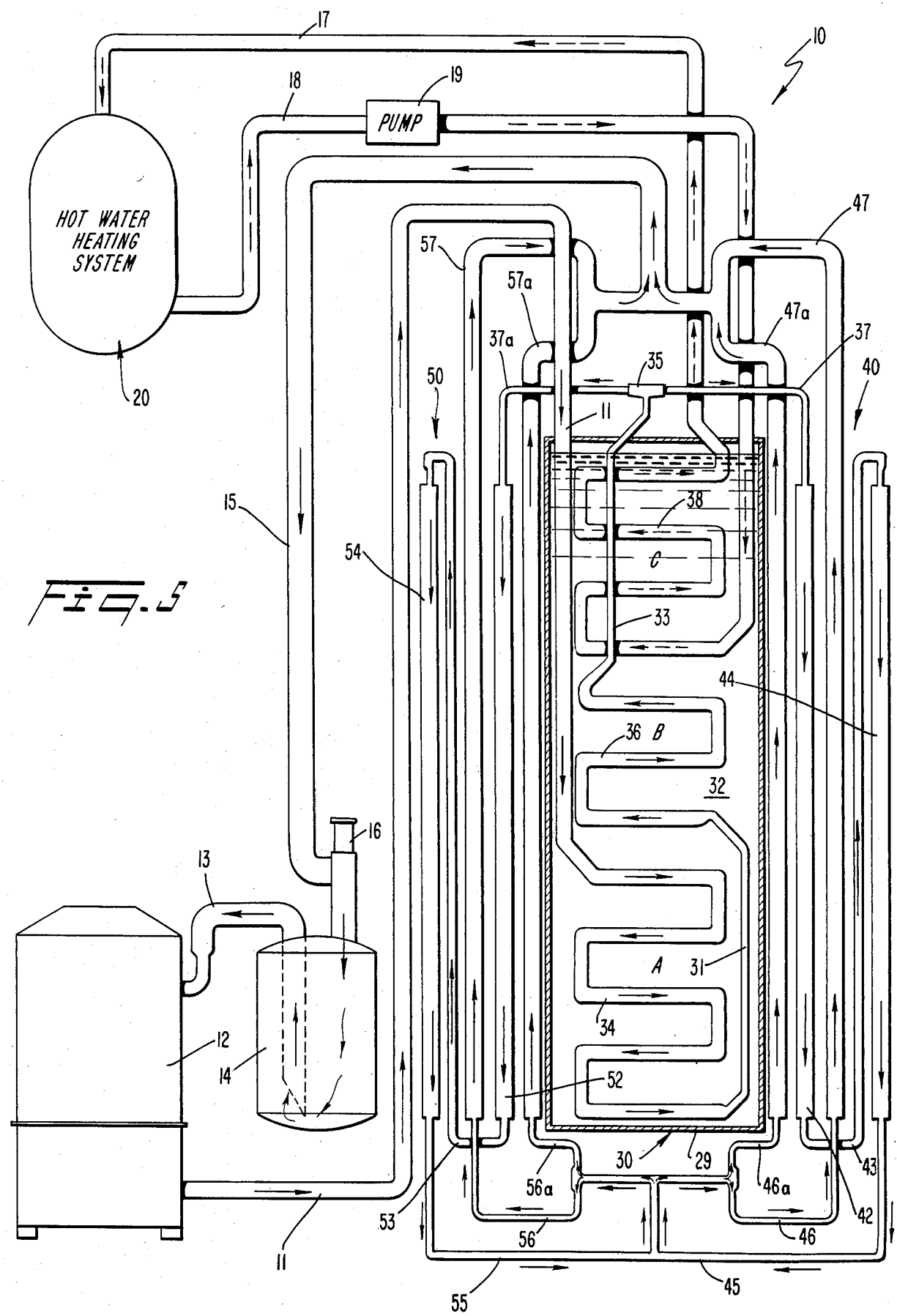

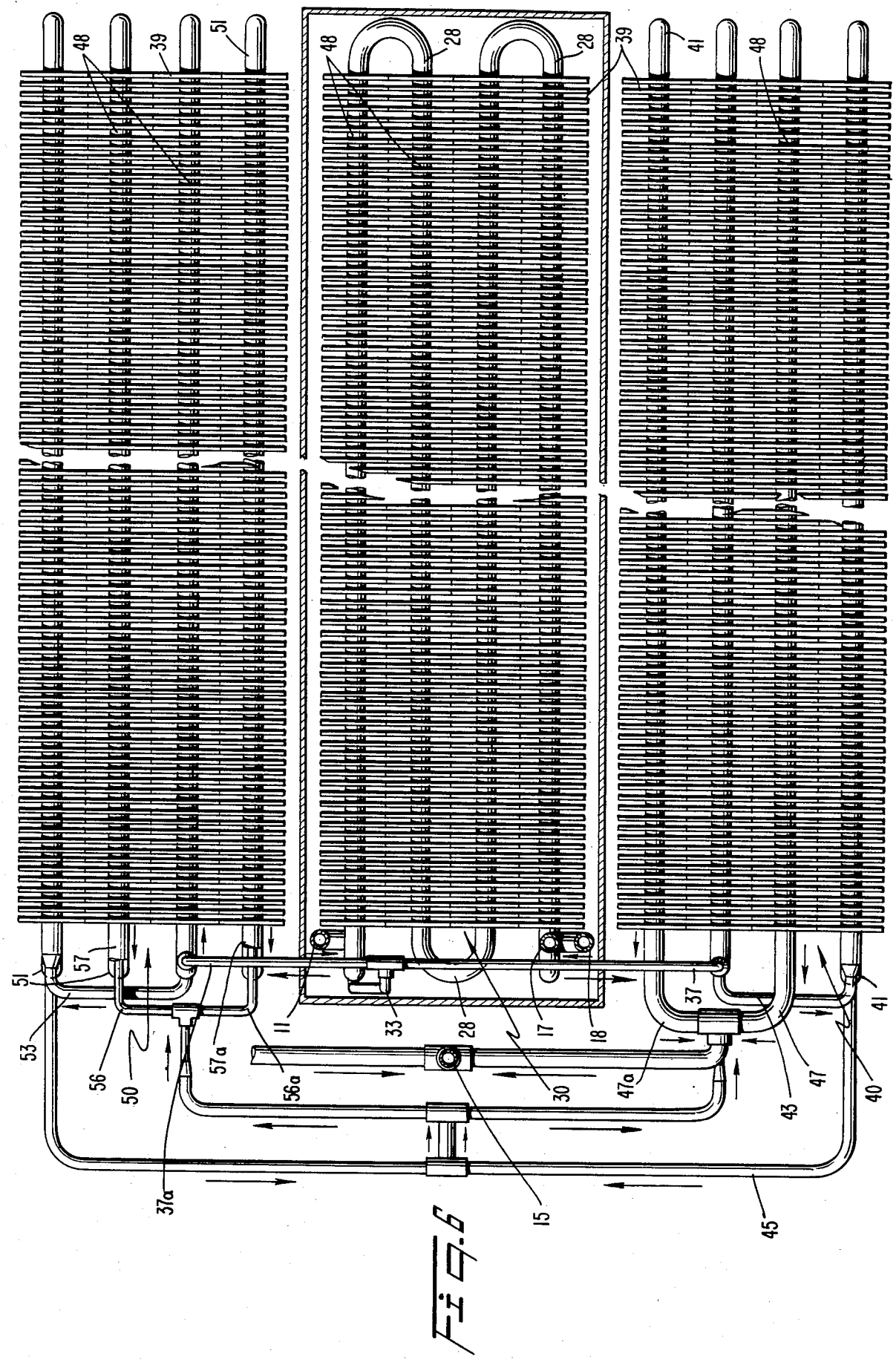

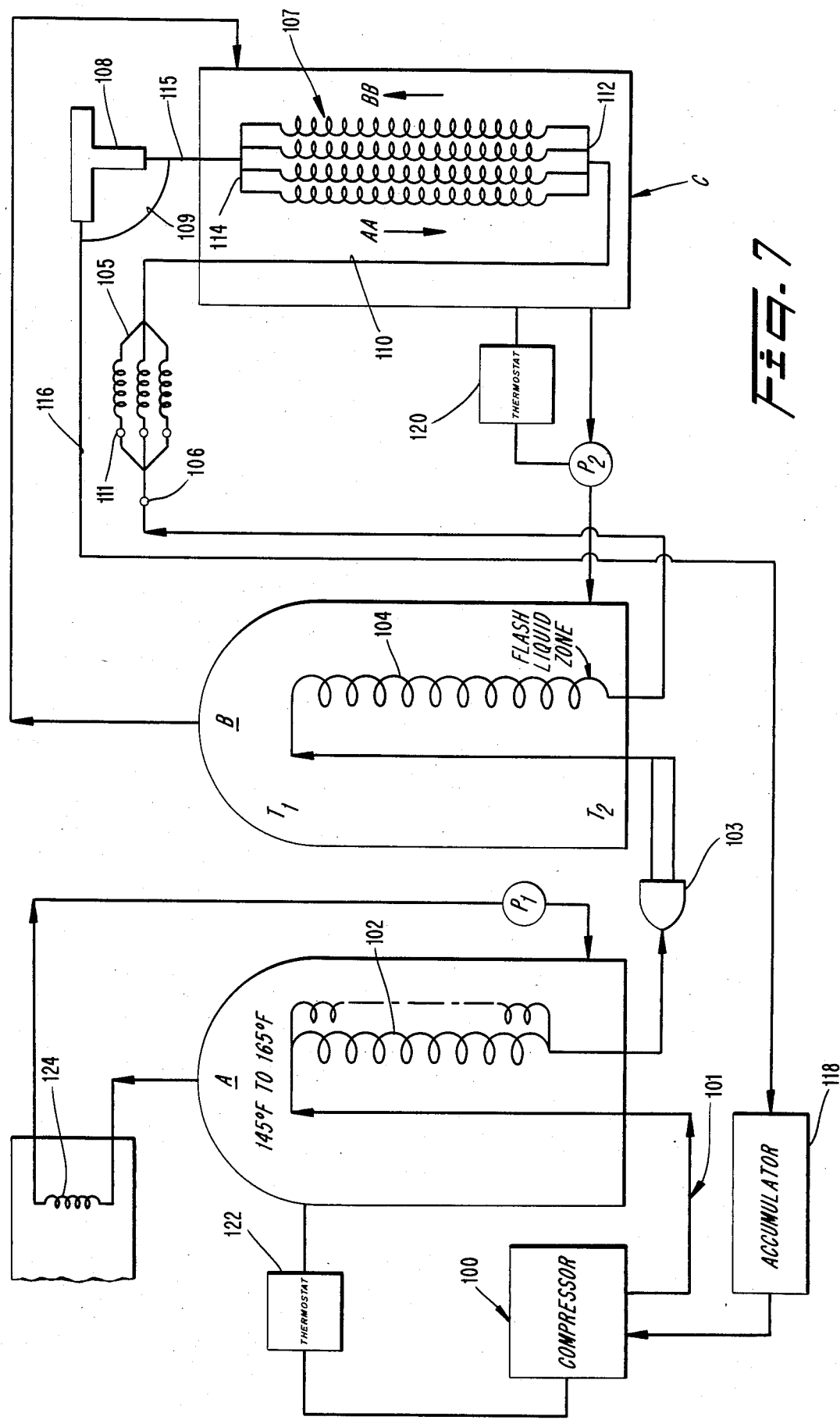

HEAT GENERATING SYSTEM AND METHOD

This is a continuation-in-part application of my co-pending U.S. application Ser. No. 385,961 filed June 7, 1982, now abandoned.

FIELD OF THE INVENTION

This invention relates to the generating of heat in a self-contained heating system. More particularly, the invention is directed to a method and apparatus for generating heat without drawing any portion of such heat from an external ambient source so that the efficiency of the system does not depend upon the ambient conditions of the surrounding atmosphere.

BACKGROUND OF THE INVENTION

The heat pump has become a conventional and widely used device for generating heat in buildings. Heat pumps include an evaporator that is located outside of the space to be heated and absorbs heat from the surrounding environment. The heat absorbed by the heat pump is directed into the building being warmed through the use of a compressor and condenser in a very well-known manner. The dependency of efficient operation for a heat pump upon the ambient environmental conditions is well-known. The evaporator serves to absorb heat from a source such as the outside air, well water, swimming pool or the ground. The efficiency of a heat pump decreases rapidly with the temperature of the heat source. Maximum efficiency is obtained when the heat source is in the range of about 40° to 50° F. The efficiency of operation drops rapidly as the heat source temperature drops below 32° F. When the temperature gets too low, heat pumps are equipped with resistance heaters which must be activated to heat the fluid heat transfer medium such as air being pumped into the building being heated. This of course, increases the cost of operation enormously.

In view of these facts, heat pumps have found application only in those geographic areas having moderately cold weather. They are generally not competitive with other types of heating systems in areas where low temperatures are experienced. The operation of these heat pumps require the use of relatively large compressors and consequently require significantly high energy inputs.

There are many types of heat generators and heat pump devices. The following U.S. patents are all directed to various types of heat generators utilizing a condensor and/or an evaporator. However, none of these patents describe or disclose the invention as set forth herein.

| | |
|---|---|
| 2,241,070 | 3,984,050 |
| 2,483,896 | 3,989,183 |
| 2,619,326 | 4,012,920 |
| 2,723,083 | 4,005,963 |
| 3,922,876 | 3,534,806 |
| 3,933,004 | 4,216,660 |

PURPOSE OF THE INVENTION

The primary object of this invention is to provide a system which will generate heat without drawing any portion of the heat from an external ambient source.

Another object of the invention is to provide a self-contained heat generating system and method of controlling the velocity, pressure and temperature of a refrigerant in a closed circuit in such a manner as to employ the heat energy absorption characteristics of superheated refrigerant to generate heat without being dependent upon ambient environmental conditions.

A further object of the invention is to provide a system having a heat generating unit which may be located at any location including the inside of a building being heated and may be developed as a portable system.

A still further object of the invention is to provide an electrically powered heat generating system powered only by an electric motor driving a compressor wherein the amount of heat generated by the system exceeds the thermal equivalent of the electrical power used by the motor during operation of the system.

Another object of the invention is to provide a self-contained heat generating system where the charge of refrigerant is caused to expand under high velocity and high temperature conditions to drive the evaporated refrigerant to its maximum saturated heat energy condition. Subsequently, the heat saturated refrigerant is compressed to a smaller volume in a compressing zone without changing the amount of heat energy present in the gas.

SUMMARY OF THE INVENTION

The invention as described and disclosed herein is directed to a self-contained heating system comprising a closed circuit means containing a refrigerant. The closed circuit means includes a heat exchange portion, a heat collecting portion and compressor means. The heat exchange portion and the heat collecting portion are disposed within the heat transfer chamber. The refrigerant is superheated in the heat exchange portion. The excess heat developed in the heat exchange portion is collected from the super-heated refrigerant within the heat transfer chamber. Heat generated within the heat exchange portion is also removed for heating any desired location such as a dwelling or commercial establishment.

The self-contained heating system of the invention comprises a closed circuit means containing a refrigerant effective to function at high velocities and under high pressures. The closed circuit means includes a first heat exchange portion, a second heat collecting portion and compressor means for circulating the refrigerant within the closed circuit means. A heat transfer chamber has a primary heat exchange section and an evaporator section. The first heat exchange portion is located in the primary heat exchange section and includes means to superheat the refrigerant therein. The second heat collecting portion is located in the evaporator section and is effective to absorb heat within the heat transfer chamber.

Thus, the invention may be defined as a combination found in a closed circuit heating system having a refrigerant circulated by compressor means through condenser means and evaporator means. The combination includes a means for increasing the amount of heat energy in an evaporated refrigerant gas within the evaporator means using only heat developed within the closed system. Means are then used to introduce the heated evaporated gas into the compressor means where the refrigerant is compressed while maintaining the same amount of heat energy therein. Consequently, the temperature of the evaporated gas is raised to significantly higher temperature as it passes through the compressor. The refrigerant is then recycled through the system to extract that heat that has been absorbed by the superheated refrigerant under high pressure and high velocity conditions within the evaporator means.

The method of generating heat according to the invention includes the steps of circulating a refrigerant through a closed circuit having a gas compressing zone, a heat transfer zone, a condensing zone and an evaporator zone. A predetermined temperature is maintained in the condensing zone so that the refrigerant is at a temperature sufficient to give up heat to the refrigerant being circulated through the evaporator zone. This temperature condition is maintained through the use of a heat transfer medium located within the heat transfer zone of the closed circuit. The heat being absorbed by the refrigerant in the evaporator zone is effective to produce heated gaseous refrigerant which is supplied to the compressing zone. Thus, the heat being given up by the refrigerant in the condensing zone is effective to preclude the necessity of drawing any heat from any source outside the closed circuit of the system.

In another feature of the method of the invention, a refrigerant is circulated through a closed circuit having a compressing zone, a heat transfer zone, a flash liquid zone, a liquid zone and a heat absorbing evaporator zone. A predetermined temperature is maintained within the flash liquid zone to heat the refrigerant as it circulates through the closed circuit. The refrigerant is compressed while in a heated gaseous state to raise the refrigerant to a further elevated temperature. The heated, gaseous refrigerant is then directed from the compressing zone to the heat transfer zone to transfer heat from the refrigerant to a heat transfer medium. The refrigerant is then directed in a restricted flow from the heat transfer zone into the flash liquid zone where the refrigerant absorbs heat energy from the heat transfer medium. A restricted flow of the refrigerant is then directed with the absorbed heat energy from the flash liquid zone into a heat transfer relationship with the heat absorbing evaporator zone which is receiving the heat from the flash liquid zone. The heated, gaseous refrigerant is then directed from the evaporator zone to the compressing zone to repeat the entire cycle.

In another feature of the invention, there is a plurality of closed containers which are each insulated from the ambient surroundings. This system includes a heat exchange zone, an energy stabilizing zone and a superheat zone. A first closed circuit includes a compressor which pumps the refrigerant through tubing located in each of the zones. A second closed circuit includes pump means for circulating heat transfer medium between the energy stabilizing zone and the superheat zone. In a third closed circuit the heat transfer medium is pumped between the heat exchange zone and the particular location being heated. This third closed circuit may include a coil carrying hot transfer medium with the coil disposed in the air plenum of a standard forced air heating system of a house or industrial building.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 5 is a schematic diagram of the fluid circuit for the heat generating system made in accordance with this invention;

FIG. 6 is a top elevational view of the unit shown in FIG. 2; and

FIG. 7 is a schematic diagram of a further embodiment of a heat generating system made in accordance with this invention.

DETAILED DESCRIPTION

Figure 1:
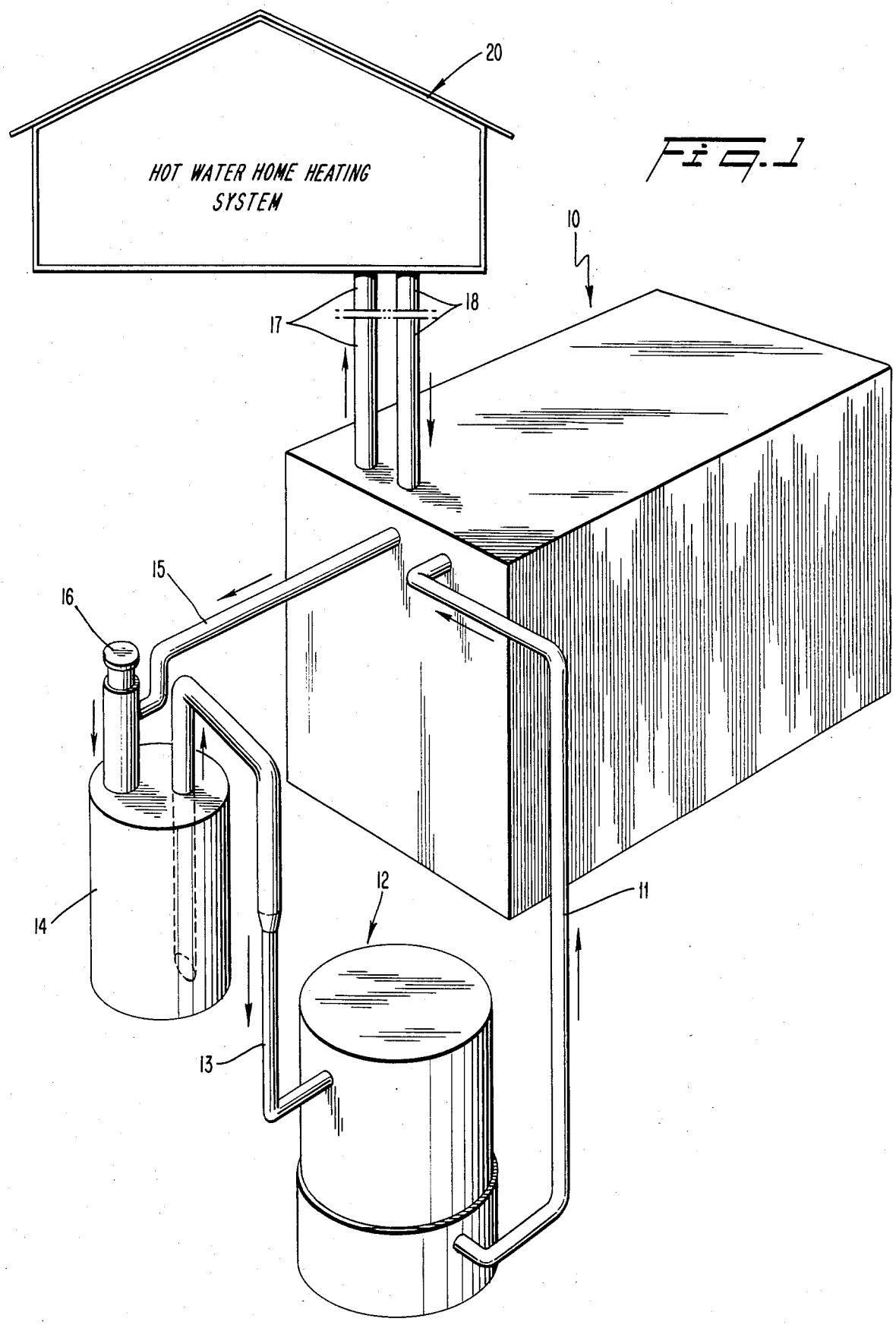
FIG. 1 is a perspective diagrammatic view of the heat generating system made in accordance with this invention.

The heat generating system as shown in FIG. 1 includes a closed fluid circuit containing a refrigerant. The closed circuit includes a compressor 12, a heat generating unit 10, a pressure regulating device 16 and an accumulator 14. Refrigerant is pumped by the compressor 12 through the line 11 to the heat generating unit 10. Superheated evaporated refrigerant flows out of the generating unit 10 through line 15 into the accumulator 14 via the pressure regulator 16. The pressure of the superheated evaporated refrigerant is lowered in the accumulator 14 and then introduced at high temperature through line 13 to the inlet side of the compressor 12 to recycle the refrigerant through the system.

Heat is removed from the heat generating unit 10 in one particular embodiment using a hot water system 20. Pump 19 directs water through line 18 into the heat generating unit 10 where it picks up heat. The heated water is then directed from the heat generating unit 10 through line 17 into the hot water heating system 20.

The self-contained heating system as described comprises a closed circuit containing a refrigerant. The heat generating unit includes an enclosed heat transfer chamber in which is disposed a heat exchange portion and a heat collecting portion. The refrigerant is superheated in the heat exchange portion. The heat collecting portion is effective to collect heat from the superheated refrigerant only from within the heat transfer chamber of unit 10.

Many types of refrigerants which are effective to function at high velocities and under high pressures may be used in this system. This includes those refrigerants which are generally used now in the standard heat pump type of system. More specifically, the refrigerant used in the specific embodiment of the present invention is Freon 12 or Freon 22. The important characteristic of these particular refrigerants is that they are able to absorb greater amounts of heat energy in the superheated evaporated state. The characteristics of superheated Freon 12 as shown in Table I are used to produce the heat source within the heat generating unit 10. Table I shows the value of the volume of the material at particular temperatures and pressures and the enthalpy in BTU's per pound mass and the entropy in BTU's per pound mass—degree R.

TABLE I

| Heat Generating Characteristics of Superheated Freon 12 | | | | |
|---|---|---|---|---|
| Pressure PSIA | Temperature Deg. F | Volume Ft³/lb M | Enthalpy BTU/lb M | Entropy BTU/ (lb M-Deg R) |
| 26.7 | 75 | 1.71 | 88.12 | .19 |

TABLE I-continued

Heat Generating Characteristics of Superheated Freon 12

| Pressure PSIA | Temperature Deg. F | Volume Ft³/lb M | Enthalpy BTU/lb M | Entropy BTU/ (lb M-Deg R) |
|---|---|---|---|---|
| 277.5 | 250.1 | .19 | 109.76 | .19 |
| 277.5 | 250.8 | .19 | 109.89 | .19 |
| 277.2 | 285 | .21 | 116.36 | .20 |

Thus it is seen that as the temperature of superheated Freon 12 increases, the enthalpy, i.e. the amount of heat energy the superheated Freon is capable of containing, significantly increases. The system of this invention is effective to have the superheated refrigerant saturated with the greatest amount of heat energy as possible to be absorbed within the heat collecting portion which includes an evaporator zone. Once the superheated evaporated refrigerant has as much heat energy as possible absorbed within the evaporator zone, it is then directed to the inlet side of compressor 12 where the compressed refrigerant experiences a significant increase in temperature at the outlet side of compressor 12. This compressed refrigerant is then recycled at the higher temperature through line 11 into heat generating unit 10. There, the additional heat energy absorbed by the superheated Freon is then extracted via a heat transfer medium 32 by the heat removing mechanism 20 which, in this particular embodiment, is a hot water system.

In the specific embodiment using superheated Freon 12, the temperature of the superheated, evaporated Freon 12 is in the range of about 90° to about 100° F. at the inlet side of compressor 12. Upon compressing the heated evaporated gas, the temperature at the outlet side of compressor 12 is from about 250° to about 300° F. The pressure at the inlet side is from about 20 psig to 45 psig. The pressure at the outlet side of the compressor 12 is from about 100 psig to about 250 psig.

Figure 2:
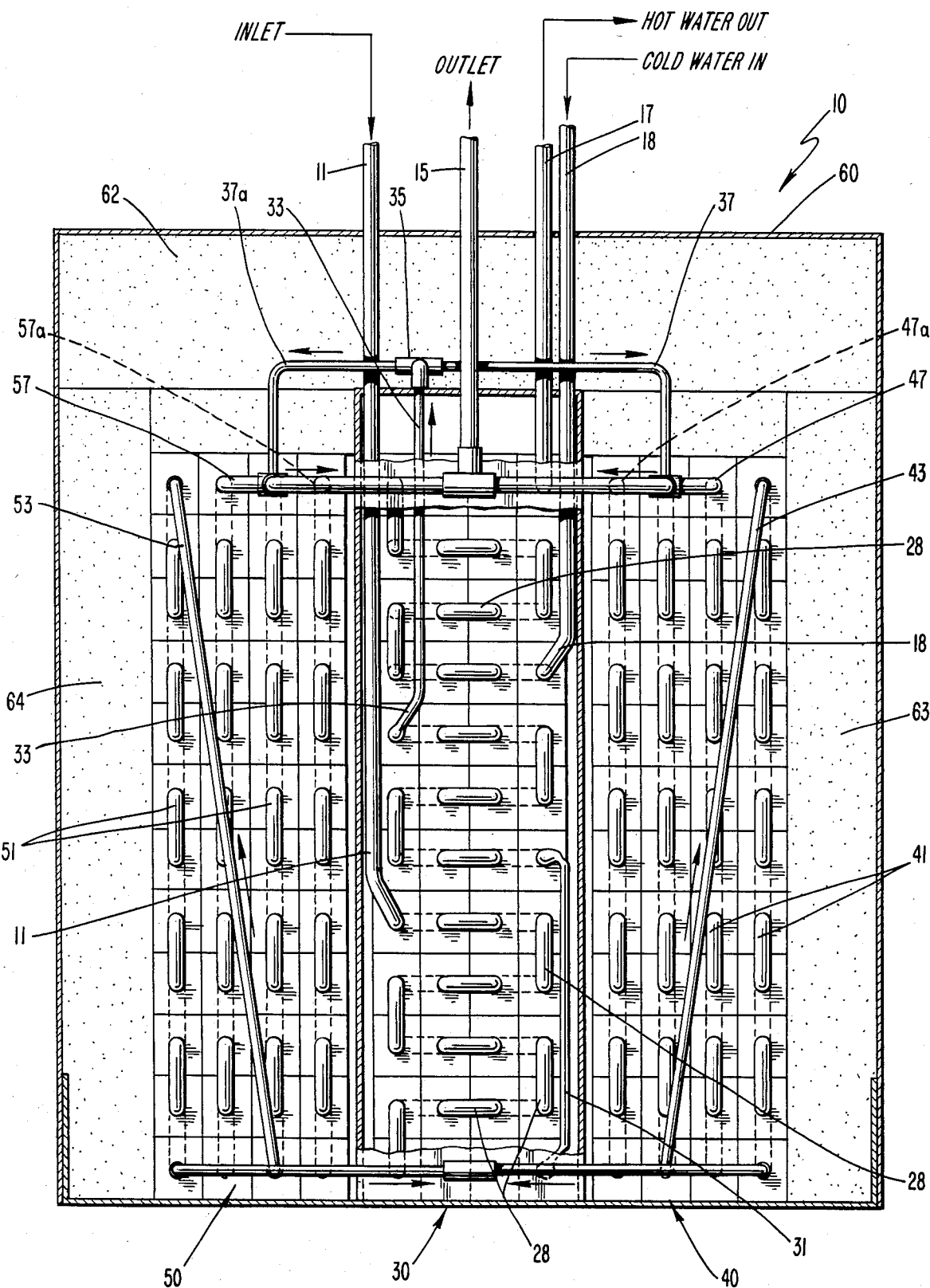
FIG. 2 is an end elevational view of a heat generating unit made in accordance with this invention.
Figure 3:
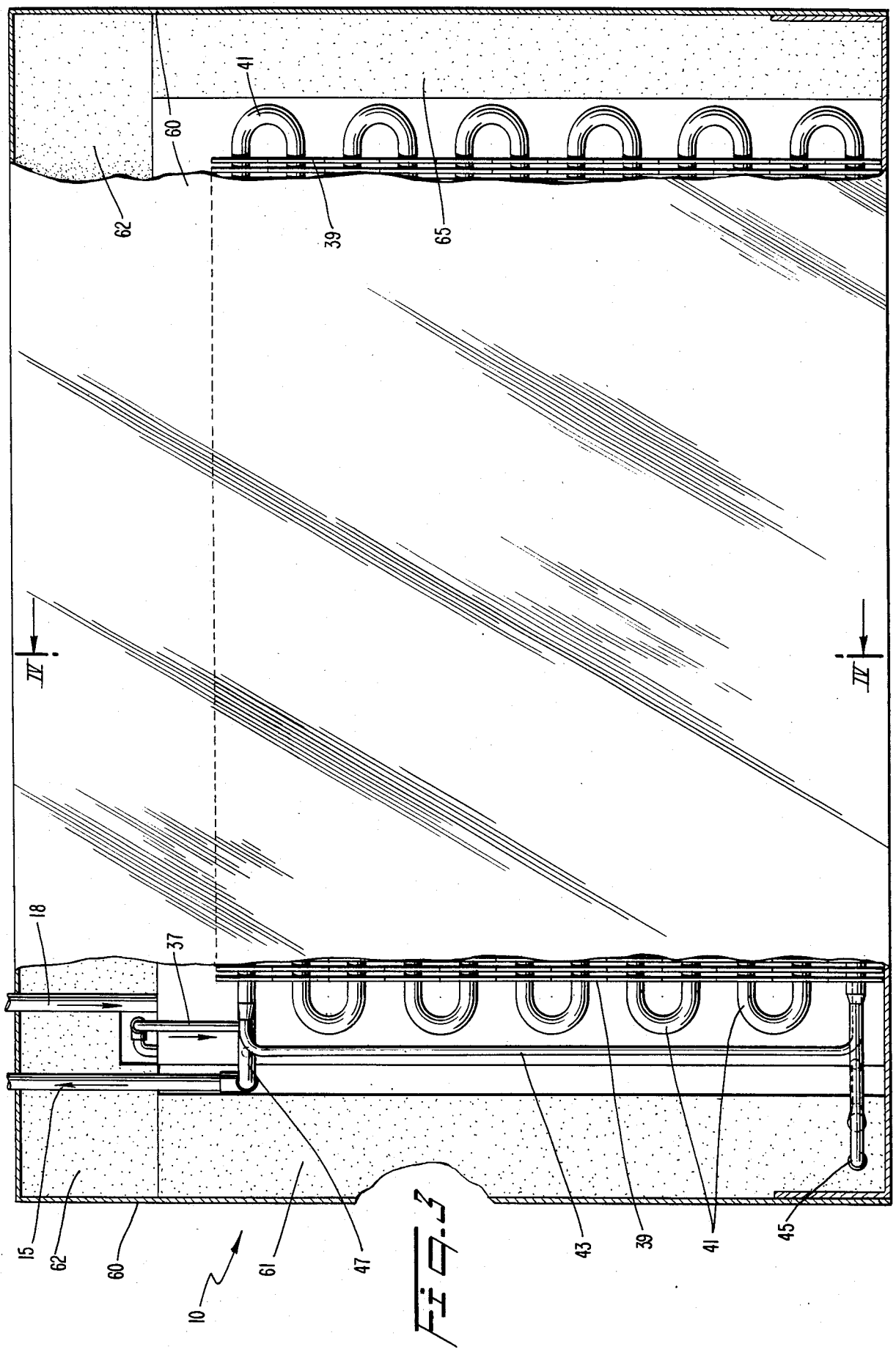
FIG. 3 is a side elevational view of the unit shown in FIG. 2.
Figure 4:
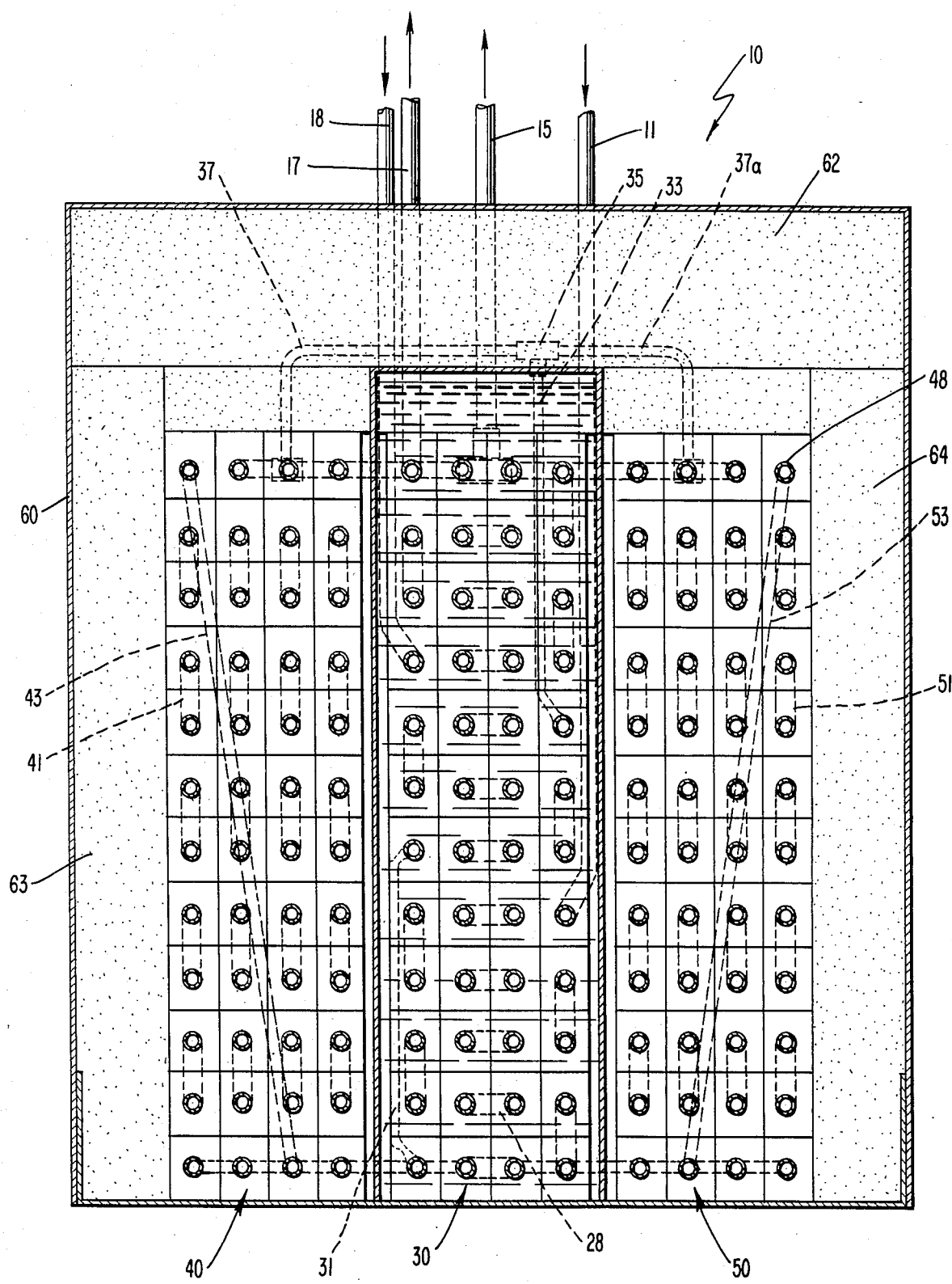
FIG. 4 is a sectional view along line IV—IV of FIG. 3.

The circuit diagram of FIG. 5 shows the movement of the superheated refrigerant through the system of this invention. A specific embodiment of an apparatus used with the system is shown in FIG. 2 and is coordinated with the circuit diagram of FIG. 5. The generating unit 10 includes a transfer chamber defined by housing 60 having top insulation 62, side insulation 63 and 64 and end insulation 61 and 65. The transfer chamber includes a primary heat exchange section 30 and heat collecting portions 40 and 50 disposed on opposite sides of the heat exchange section 30.

The primary heat exchange 30 includes a heat transfer zone A, a superheat transfer zone B and a heat removing zone C. The heat transfer zone is located at the bottom of the heat exchange section 30. Heat exchange section 30 is defined by a housing 29 in which there is disposed a heat transfer medium 32. Closed conduit means are coupled at one end to the outlet side of compressor 12 and connected at the other end thereof to the inlet side of the compressor 12. The specific embodiment is defined by continuous tubing extending through various zones and regions of the system.

The continuous tubing defines a heat exchange portion located within the heat exchange section 30 and a heat collecting portion found in the heat collecting sections 40 and 50. The tubing 11 directs the superheated refrigerant downwardly to the tubing section 34 located in the heat transfer zone. Here the heat is transferred through the tubing to the heat transfer medium 32. In this specific embodiment, the heat transfer medium is a liquid such as water or ethylene glycol. The heat transfer medium may be any type of material that will effectuate the heat transfer between the different mediums inside and outside of the tubing used in the closed circuit of the system. If it is liquid, it has to be such that it will not evaporate. Solid particles might be used for the heat transfer medium in place of the liquid so long as the appropriate heat exchange characteristics are available. The housing 29 is open to ambient conditions so that no pressure build-up occurs within the heat exchange secton 30.

The tubing section 31 is restricted thereby increasing the velocity of the refrigerant as it passes from the heat transfer zone A to superheat zone B where the refrigerant begins to liquify to form a flash liquid section 36 in the tubing. Here in the super-heat zone B, the flash liquid refrigerant absorbs heat energy as it expands from the restricted section 31 (⅛ inch I.D.) into the expanded section 36 of the tubing. The refrigerant picks up from about 30° to about 40° F. of temperature within the superheat zone B. It is then directed to the heat collecting portions 40 and 50 to have this heat energy, absorbed by the refrigerant in superheat zone B, given up in a condensing zone and then transferred to a smaller amount of refrigerant that is in the superheated evaporated state within the evaporators on either side of the heat exchange section 30.

As the superheated refrigerant moves through restricted sections 33, 37, 37a, its velocity increases and it then expands as it moves downwardly in expansion segments 42,44 and 52,54 to release that heat energy picked up in the superheat zone B. Thus, the refrigerant changes to liquid as it moves to the bottom of the evaporator sections 47, 47a and 57, 57a. Thus the system has a primary superheat section located within the heat exchange section 30 and an auxiliary superheat section as the refrigerant travels downwardly in the heat collecting portions 40 and 50 located on opposite sides of the heat exchange section 30.

The hot water system 20 includes a tube section 38 located in the heat removing zone C located at the top of the heat exchange section 30. Thus, heat is transferred from the heat exchange medium 32 to the fluid medium flowing within the circuit of the hot water heating system 20.

The refrigerant in its flash liquid state is directed from the superheat zone B in heat exchange section 30 upwardly through a restricted section 33 to a divider coupling member 35. The further restrictive tube sections 37 and 37a direct the superheated flash liquid refrigerant to the respective heat collecting sections 40 and 50. Thus, the refrigerant is caused to move at higher velocities into the top of the gas expanding segments 42 and 52 from the respective restrictive tubing sections 37 and 37a, respectively. Restrictive sections 43 and 53 carry the flash liquid from the bottom of sections 42 and 52 to the top of gas expanding segments 44 and 54, respectively. As the refrigerant moves downwardly through the expanding segments 42, 44 and 52, 54, refrigerant is passing through a condensing phase where heat is being given up. At the bottom of the expanded segments 44 and 54, the refrigerant is now in a liquid state. The liquid refrigerant is still at a high temperature and moving at a high velocity due to the restricted travel through the tube sections 45 and 55. The refrigerant moves through greater restrictive sections 46, 46a, and 56, 56a to direct the flow of refrigerant upwardly through the evaporator expanding segments 47, 47a and 57, 57a, respectively.

The liquid refrigerant expands at extremely high velocity into the bottom of the expanding segments 47, 47a and 57, 57a. The refrigerant evaporates to a gaseous state as it travels upwardly in evaporator segments 47, 47a and 57, 57a. Heat energy is absorbed by the evaporated gaseous refrigerant from the condensing segments 42, 44 and 52, 54 as it moves upwardly through the evaporator segments. Thus, small volumes of refrigerant are expanded under heat absorbing conditions so that the greatest amount of heat energy may be absorbed by the superheated, evaporated refrigerant as it passes upwardly through the evaporator segments 47, 47a and 57, 57a. All of the superheated, evaporated refrigerant is then directed into the tubing section 15 which is connected to the inlet side of compressor 12.

The capacity for the refrigerant to absorb heat within the sections 47, 47a and 57, 57a is immense. If there were not enough heat to be absorbed by the evaporated gas moving upwardly in these evaporator segments, the result would be to freeze or cool the surroundings. Thus, the basic idea of this invention is to provide a source of heat that will literally overpower the cooling cycle of the refrigerant with the superheated refrigerant moving downwardly through the condensing segments 42, 44 and 52, 54 of the heat collecting sections 40 and 50, respectively. A load is established within the system such that it is greater than the evaporator sections can handle. The load is then allowed to enter compressor 12 at its highest regulated rate or load and the rest or remainder of the excess load is then banked beyond the compressor 12 and thereby backs up into the evaporator sections. Consequently the superheat section B in the heat exchange section 30 becomes more and more efficient.

The load is first established by heating the heat transfer medium 32 up to a temperature sufficient to create enough heat energy in the superheated refrigerant traveling into the top of the sections 42,44 and 52,54 such that there is enough heat to more than supply the capacity for the evaporated refrigerant within the evaporator sections 47, 47a and 57, 57a. In other words, there is going to be an excess amount of heat so that the full enthalpy or capacity to hold heat energy is reached within the superheated refrigerant.

The control pressure regulator 16 is used to regulate the temperature and pressure within the closed system. Thus, the refrigerant is directed into the inlet side of the compressor 12 at a controlled rate. The inlet side of the pressure regulator 16 could be as high as 200° F. A pressure drop occurs across the pressure regulator so that the temperature at the outlet side of regulator 16 moves down to the temperature desired to direct the evaporated gas into compressor 12. Regulator 16 is set to maintain a load that is below the maximum load that compressor 12 is capable of handling.

The closed or sealed type of compressor can be loaded with an input temperature of about 90° to 100° F. with an outlet temperature of up to about 300° F. This is a winding type of compressor which is hermetically sealed and must be cooled by the refrigerant. With an open type compressor, the outlet temperature may be up to 400° F. Thus, the open type compressor may be more efficient because it can use hotter temperatures going into the compressor.

The accumulator 14 maintains a constant load so that the compressor 12 has a constant imput at a controlled pressure. The line 13 from the accumulator 14 is reduced to make sure that there is a full capacity of heated, evaporated gas maintained at the inlet of compressor 12.

To start the system, the heat transfer medium 32 is set at an elevated temperature. When using Freon 12, the temperature of the heat transfer medium 32 should be in the range of about 140° to 190° F. The higher the temperature, the more efficient is the operation. It is desired to minimize the volume of the heat transfer medium 32. Once it is at temperature, a thermostatic control is set to maintain the temperature of the transfer medium 32. Thus, with the termostat controls set at a minimum of about 140° F., the compressor 12 will come on when the temperature of the transfer medium 32 falls below 140° F. This will put heat into the transfer medium 32 so that it is maintained at the desired temperature. The insulation on the inside of the housing 60 is designed to keep any heat within the transfer medium 32 from escaping into the environment. In other words, everything within housing 60 is enclosed with respect to ambient surroundings. As is evident from the disclosure, the temperature within housing 60 is higher than the temperature of the ambient surroundings. As a result of these facts, heat is absorbed only from within housing 60.

The particular structural configuration used to form the continuous tubing circuit shown in FIG. 5 may be constructed as shown in FIG. 2. The closed circuit includes a plurality of elongated tubes 48 juxtaposed in side-by-side relationship with respect to each other to form a bank of tubes. The tubes all have the same internal diameter of $\frac{3}{8}''$ and carry heat exchange fins 39 which are used to enhance the heat transfer characteristics thereof. In this specific embodiment, there are 144 tubes 48. The bank of tubes 48 have a center bank section 30 and two outer bank sub-section 30 and two outer bank sections 40 and 50. The heat exchange section is in the center bank sub-section 30 and the heat collecting or evaporator sections are located in the two respective outer bank sub-sections 40 and 50.

The elongated tubes 48 in the center bank sub-section 30 are interconnected in series with coupling end tubes 28 to form a first continuous tubing section through the heat exchange portion 30. The elongated tubes 48 in each of the two respective outer bank sub-sections 40 and 50 are interconnected in series with coupling end tubes 41 and 51, respectively to form second continuous tubing sections through the heat collecting portion. Sections 40 and 50 then constitute two, balanced evaporator zones each being disposed adjacent opposed sides of the heat exchange portion 30.

The center bank sub-sections 30 of elongated tubes 48 are interconnected in series with the two outer bank sub-sections 40 and 50 by divider coupling sections 33, 35, 37 and 37a for directing equal amounts of refrigerant from the center bank sub-section 30 to the two respective outer bank sub-sections 40 and 50. Thus, compressor 12 is connected to circulate the refrigerant from the outlet side first to the heat exchange portion in the center bank sub section 30 and then equally divided to each of the two balanced evaporator sub-sections 40 and 50. The coupling section 33 has an inside diameter of $\frac{5}{8}''$ and the coupling sections 37 and 37a have inside diameters of $\frac{3}{8}''$.

A first part of the tubes 48 in the heat exchange subsection 30 forms a primary heat exchange zone, a second part of the tubes in the bank defines a superheating zone. A part of the overall bank located in each of the two outer bank sub-sections 40 and 50 define an auxiliary superheating zone where the superheated flash liquid refrigerant moves downwardly to the bottom of the sub-sections 40 and 50. A fourth part of the bank found in each of the sub-sections 40 and 50 defines an evaporator zone where the superheated, evaporated refrigerant moves upwardly within the evaporator segments 47, 47a and 57, 57a. The two outer bank sub-sections 40 and 50 disposed in opposite sides of the heat exchange section 30 are interconnected in series by the coupling sections 45, 46, 46a and 55, 56, 56a. In this section, the refrigerant is in a liquid state. In this specific embodiment, the inside diameter of sections 45 and 55 is ⅜". The inside diameter of sections 46, 46a and 56, 56a is ¼". Thus, the liquid refrigerant is moving at a very high velocity as it burst into the bottom of the evaporator segments 47, 47a and 57, 57a from a ¼" inside diameter to the ⅜" inside diameter of the elongated tubes located in that portion of the bank of tubes 48.

The temperature of the heat transfer medium 32 within the heat exchange section or tube sub-section 30 must be maintained at a maximum range of from about 140° F. to 250° F. When using Freon 12, the most efficient range would be from about 140° F. to about 185° F. These temperatures will change depending upon the particular refrigerant being used, the desired balance required within the system and the type of compressor 12 being used. The pressure builds up within the system behind the restricted portions of the tubing located at the top inlets and bottom inlets of the tube banks as described. The system takes into account both temperature and pressure considerations so that there is a giving up of the heat within the condensing zone as the refrigerant moves downwardly and a reabsorbing of that same heat energy by a smaller volume in the evaporator. Thus, the total amount of heat energy being absorbed by the superheated evaporated gas is greatly increased as it moves through the evaporator. The mass of the evaporated refrigerant is fully saturated with heat energy as it passes into compressor 12. As the refrigerant is compressed, the temperature raises. Thus, a smaller volume of gas carries a higher heat energy into the heat exchange sub-section 30 of heat generating unit 10.

At 140° F. the Freon 12 moves at a velocity that will achieve the best coefficient of operation for the system. The 140° F. minimum temperature in the heat exchange section 30 overpowers the effects of the evaporator and thereby eliminates any possible cooling effected by the gas within the evaporator section. Thus, evaporator sections 47, 47a and 57, 57a are always picking up excess heat that can be further compressed within the compressor 12.

The pressure regulator is set for 60 lbs. of pressure and runs fully open. If the pressure were reduced at the pressure regulator 16, the temperature in zones B and C of the heat exchange section 30 would automatically increase in temperature. The pressure may be set by regulator 16 in the range of 60 to 120 psig.

In a test run, a hermetically sealed closed type compressor 12 was operated at 230 volts in a range of 23 to 25 amps. For one hour of operation, this is an energy use of about 5.750 kilowatt-hours or 19,625 BTU's. To equate BTU's of heat energy to electrical energy, the following calculation is required.

$$\text{Volts} \times \text{amps} = \frac{\text{watts}}{1000} = \text{kilowatts}$$

kilowatt-hours × 3,413 BTU's/kilowatt-hour = BTU's
One BTU is that amount of heat required to raise one pound of water 1° F.

In operation, two 275 gallon tanks were filled with water at 60° F. The heat transfer medium 32 in the sub-section 30 was also water and contained 35 gallons at 60° F. The total amount of water was raised from 60° to 160° in 8.5 hours. Heat losses were not calculated. Based upon the following calculations, the total output for the heating of the 585 gallons of water was 487,305 BTU's. This is compared to the input of 19,625 BTU's per hour. The 487,305 BTU's has not been divided by 8.5 hours. This gives a ratio of 2.92 to 1 in terms of heat output to energy input into the system. No heat was being obtained from any of the ambient conditions other than the evaporated superheat Freon 12.

The load or charge of refrigerant in the system of the present invention is not as critical as some prior art devices. A charge of about 5 lbs. of Freon 22 or a charge of about 6 lbs. of Freon 12 may be efficiently used to operate the system as shown in the present case. This type of charge is used with a conventional airconditioning compressor rated at 5 tons. The open type of compressors may also be used in conjunction with this system.

In another example of the invention, water from a water heating system was pumped at a rate of 10 gallons per minute or 600 gallons per hour. The inlet temperature was about 135° F. while the output temperatures were about 150° F. This is a difference of 15° F. for the water. Over a period of an hour, the 600 gallons of water is equal to about 5,000 lbs. of water per hour. The number of BTU's is 5,000 lbs. water per hour times 15° F. difference to equal about 75,000 BTU's output. At the same time, the compressor in the system requires an electrical input equivalent to about 17,662 BTU's per hour.

The system as set forth herein expands both the evaporated gas and then superheats the evaporated gas. In this fashion you are adding a load to the refrigerant where you are normally trying to reduce the load. Instead of reducing a load, the superheated evaporated gas goes into the compressor as a maximum load that cannot be reduced. This takes advantage of the phenomenon that the superheated evaporated refrigerant will hold a significantly larger amount of heat energy as set forth above. There is far more heat energy or BTU's in the superheated evaporated gas than in the gas that is traveling from an evaporator at 45° F. back through the compressor. That is, an evaporator gas that will enter the evaporator at 45° F. then is superheated up to 65° F. in an evaporated state and then goes into the compressor, has a much greater capacity for heat energy. Thus, the poundage of the refrigerant does not change as it moves through the compressor. However, the heat value does change and is extracted out in the heat exchange zone and absorbed by the heat exchange medium therein.

The heat generating system shown in FIG. 7 includes a first closed circuit for the refrigerant which includes the compressor 100, the heat exchange container or chamber A, an energy stabilizing container or chamber B, and the evaporator chamber C. Refrigerant is pumped by compressor 100 through line 101 to the top of a heat exchange coil 102 located in the heat exchange chamber A. The refrigerant gives up heat to the liquid heat transfer medium located in container or heat exchange chamber A.

In this particular embodiment, coil assembly 102 includes two coils of ⅜" diameter. There is about 100 feet of coil within heat exchange coil assembly 102. A single header at the top of coil assembly 102 goes into two separate coils. The hot gas carried by the two coils is thus capable of having heat transferred much more readily from the coil to the liquid medium within the container A. The refrigerant is from about 280° F. to 300° F. entering container A and is Freon in this specific embodiment.

With the refrigerant traveling through the coils 101 and 102, the liquid transfer medium, water in this case, is brought up to a temperature of about 165° F. A thermostat 122 is set in the cycle so that when the water temperature within container A comes down to about 145° F., the compressor 100 is activated and pumps the refrigerant through the first closed circuit. This specific embodiment is designed so that the temperature of the liquid transfer medium in container A does not go below 145° F.

Before the system can be run on a continuous basis, there must be a preheating stage so that the heat transfer medium in container A reaches the desired temperature. Once the predetermine temperature is established, the system is ready for use. Pump P1 drives the heated transfer medium through a hot coil 124 located in the air plenum of a forced air heating system and the output of heat approaches as close to the maximum output of compressor 100 as possible. For example, if the output of the compressor is 60,000 BTU's the system will work at peak efficiency. The refrigerant is being expanded, contracted and the temperature of that refrigerant is being maintained as it goes through the closed circuit including compressor 100. The heat is picked up and transferred in the most efficient way possible taking into account the fact that superheated, evaporated refrigerant is being used.

As pump P1 operates, the liquid transfer medium gives up heat and thus, the temperature of the medium tends to be reduced. While refrigerant is being pumped through the first closed circuit, the temperature within the liquid transfer medium in the heat exchange zone of container A will tend to increase. This circuit constitutes the third closed circuit of the system shown in FIG. 7. Obviously, the hot coil 124 could be used for baseboard heating, radiation heating, or any other type of heating where water is being used as the liquid transfer medium. Thus, the system of this invention can be adapted to any existing heating systems now being used in the heat generating field.

The containers A and B can consist of standard containers made by Amtrol Company using a product referred to as a "Boiler Mate" having a coil mechanism within the center of each one of the containers A and B. The liquid transfer medium within each of the containers A and B is carefully controlled. Each container in this embodiment has a capacity of about 60 gallons of liquid transfer medium.

As the refrigerant comes out of the coil 102 from the bottom of container A, it is forced through restrictor 103 into two smaller tubes. The refrigerant temperature at the bottom of container B is about 145° F. and at the bottom of coil 104 is about 90° F. The structure of coil 104 is the same as the double coil 102 in container A. The temperature within the heat transfer liquid in container B at T2 is always less than temperature T1 at the top of container B. The temperature in the liquid transfer medium of container B is generally maintained at about 10° F. less than the liquid transfer medium located in container A.

As the refrigerant moves downwardly through coil 104, it moves through a flash liquid zone where it is superheated flash liquid refrigerant. As the refrigerant moves out of the bottom of coil 104 and upwardly into metering device 105, it passes by a first sight indicator 106 and then into the metering device 105 having three separate legs. Each leg has a sight indicator 111 as shown.

The idea is to control the amount of refrigerant going through the system. For example, if device 105 is fully opened, the system may be capable of six tons. If it is partially opened, it may be capable of about 4½ tons. The more refrigerant going through the system at metering device 105, the higher is the tonnage for the system. The metering device 105 then has either capillaries or restricted devices controlling the amount of refrigerant passing into the evaporator zone C. Two of the three legs of metering device 105 are always used in this embodiment. The velocity of the refrigerant must not be decreased or destroyed as it moves through metering device 105. Thus, it is important that the density and velocity of the refrigerant gas is controlled going into the evaporator C.

It is important to match the back pressure in compressor 100 during operation. The compressor load should be substantially steady and the load behind the crankcase pressure regulator (CPR) 108 should be at least 85 or 90 psi to furnish a load of 50 to 60 psi on compressor 100. Thus, coming out of the top of coil 107 in evaporator C, the load would be 90 psi. The CPR 108 opens up consistently as the refrigerant is drawn up through compressor 100. The use of a bypass 109 with CPR 108 which has a spring loaded valve precludes any jerk within the closed refrigerant circuit. The loading devices on the CPR 108 should stay constant. It is possible to bleed some of the pressure behind CPR 108 using the bypass 109 to a position in front of CPR 108. Once the refrigerant moves out of the CPR 108, it then passes back into compressor 100. Either a piston type compressor or a rotary type compressor may be used to pump the refrigerant through the closed circuit.

A constant, pre-set temperature is maintained against the exterior of the evaporator coils 107. The liquid transfer medium moves within the second closed circuit between the evaporator C and container B using pump P2. The evaporator chamber C has to reach a predetermined temperature before pump P2 will come on to supply the cycling of the liquid transfer medium. The temperature at the top of superheating container B is maintained at from about 135° to 150° F.

The temperature in container A is maintained at from about 145° to 165° F.

The refrigerant traveling from metering device 105 through evaporator C becomes superheated, evaporated refrigerant as it travels upwardly in the direction of arrow BB through coils 107. In this section, the refrigerant is picking up heat from the liquid transfer medium within the evaporator C. The refrigerant is first expanded from the single tube coming from metering device 105 into a header 112 located at the bottom of evaporator C. Tube 110 has a diameter of ⅞" and extends downwardly to the bottom of the container C to header 112. Four ½" tubes extend upwardly from header 112 to form the bank of coils 107. Coils 107 extend upwardly to header 114 into a 1⅛" diameter tube 115. The CPR 108 is a 1⅛" device and the return tubing 116 is 1⅛" all the way back to accumulator 118 and on to compressor 100.

A drier strainer may be used within the system to keep the refrigerant gas dry. Such a strainer is well known and additionally would be useful in maintaining the refrigerant clean.

The refrigerant in the first closed circuit must move with rapid velocity and in a pulsation mode. Such a pulsation is temperature dependent in the system so that a force or positive action is created or a drop off or negative action is effected depending on the temperature characteristics of the system. The amount of refrigerant gas is maintained so that the refrigerant does not run as a solid stream through the system. This can be determined by viewing through the various sight valves 106 and 111.

The amount of refrigerant charge in the first closed circuit is maintained to develop a pre-set temperature level of 90° F. in the liquid transfer medium of evaporator C. This pre-set temperature level is used to start the operation of the system. Because the refrigerant runs in a closed circuit, once the charge is placed in the first closed circuit, then unless a leak occurs, then there would be no further requirement for additional refrigerant.

Thus, the volume of refrigerant inside the closed circuit is determined to achieve the pulsation balance. The charge is sufficient to fill up the basic volume within the heat exchange zones. In this embodiment, compressor 100 is a Tecumseh five ton closed or sealed compressor. The accumulator 118 is of the same type as used in the previous embodiments. Accumulator 118 is used to reduce the pressure in the system back down to about 60 psi. and gives a full charge of static consistency to the charge being acted upon by compressor 100.

The second closed circuit conveys liquid heat transfer medium from the top of container B into the top of evaporator C. The liquid medium moves downwardly within evaporator C when pump P2 operates to pump liquid out of evaporator C into the bottom of container B. As the liquid heat transfer medium moves downwardly, it gives up heat to the refrigerant which is moving upwardly within coils 107. Thus, the evaporated refrigerant is superheated. The temperature of the refrigerant coming out of metering device 105 into the tube 110 may be about 20° F. As the refrigerant moves into the header 112, it expands and begins to move at a high rate of speed upwardly through coils 107 and picks up a tremendous amount of heat from the liquid medium within the container of evaporator C.

The thermostat 120 maintains the temperature of the liquid transfer medium (water in this embodiment) at a pre-determined temperature within evaporator C. If the temperature of the liquid transfer medium at the bottom of evaporator C goes below 60° F., the thermostat 120 activates pump P2 and circulation of the liquid transfer medium is begun. For the best efficiency, the temperature in the liquid medium should be set at about 120° F. However, as noted, the temperature may be set at about 90° F. in evaporator C.

With the temperature of the refrigerant in line 110 being from about 0° to 35° F., the maintaining of the transfer medium at about 120° F. is extremely efficient since the transfer of heat from the liquid transfer medium to the refrigerant will be extremely good. The refrigerant is being pulled by compressor 100 through coils 107. The temperature of the refrigerant is driving the refrigerant with the result that there is a fast loop from the top of coil 107 to the place behind the CPR 108. The pressure within line 115 ahead of the CPR 108 may be about 100 psi. while the temperature behind may be about 60 psi.

Pump P2 operates at a flow rate of from about 2 gallons a minute to 5 gallons a minute. This maintains the temperature balance between the temperatures in the liquid transfer medium in superheating container B and evaporator C. The temperature at the bottom of container B is about 70° F. and at the top of container B is about 150° F. The temperature at the bottom of evaporator C is about 90° F. and at the top of evaporator C is about 145° F. The lines carrying transfer medium and refrigerant from one container to another are all appropriately insulated.

While the heat generating system and method has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A self-contained heating system comprising:
   (a) closed circuit means containing a refrigerant,
   (b) means-defining an enclosed heat transfer chamber which is closed with respect to ambient surroundings,
   (c) said closed circuit means including a heat exchang portion, a heat collecting portion and compressor means,
   (d) said heat exchange portion and said heat collecting portion being disposed within the enclosed heat transfer chamber,
   (e) said heat exchange portion including means to superheat said refrigerant
   (f) said heat collecting portion being effective to collect heat from the superheated refrigerant only from within the heat transfer chamber, and
   (g) means for removing heat from the heat exchange portion.

2. A system as defined in claim 1 wherein said refrigerant is effective to function at high velocities and under high pressure.

3. A system as defined in claim 2 wherein said refrigerant is Freon 12 or Freon 22.

4. A system as defined in claim 1 wherein said transfer chamber defining means comprises an insulated housing.

5. A system as defined in claim 4 wherein the transfer chamber includes a primary heat exchange section which contains said heat exchange portion of the closed circuit means and an evaporator section which contains said heat collecting portion of the closed circuit means.

6. A system as defined in claim 1 wherein said compressor means is connected to circulate the refrigerant first to the heat exchange portion and then to the heat collecting portion.

7. A system as defined in claim 6 wherein said compressor means has an inlet side and an outlet side, said closed circuit means includes an accumulator means connected to the inlet side of the compressor means and pressure regulating valve means connected to the accumulator.

8. A system as defined in claims 6 or 7 wherein said closed circuit means includes closed conduit means coupled at one end to the outlet side of the compressor means and connected at the other end thereof to the inlet of the compressor means.

9. A system as defined in claim 8 wherein said closed conduit means comprises continuous tubing.

10. A system as defined in claim 9 wherein said continuous tubing defines the heat exchange portion and the heat collecting portion,
said heat transfer chamber includes a primary heat exchange section which contains said heat exchange portion of the continuous tubing and a heat transfer medium surrounding said heat exchange portion,
said heat exchange portion including an initial heat transfer zone and a superheat transfer zone,
said-heat removing means being located in the primary heat exchange section and being surrounded by said heat transfer medium to receive heat being transferred from said heat exchange portion.

11. A system as defined in claim 10 wherein said heat transfer medium is a liquid.

12. A system as defined in claims 1, 6 or 7 wherein said closed circuit means includes means for increasing the velocity of the refrigerant between the heat exchange portion and the heat collecting portion.

13. A system as defined in claim 9 wherein said continuous tubing defines the heat exchange portion and the heat collecting portion,
said heat transfer chamber includes a primary heat exchange section filled with a heat transfer medium,
the heat exchange portion of the tubing and the heat removing means being disposed in the heat transfer medium to transfer heat to the heat removing means,
said heat collecting portion has gas expanding segments in which the refrigerant expands in the presence of heat located within the heat transfer chamber whereby the expanded gas absorbs heat before being introduced at the inlet side of the compressor means.

14. A system as defined, in claim 8 wherein said heat collecting portion has gas expanding segments in which the refrigerant expands in the presence of heat located within the heat transfer chamber whereby the expanded gas absorbs heat before being introduced at the inlet side the compressor.

15. A system as defined in claim 14 wherein said heat collecting portion includes a plurality of elongated tubes juxtaposed in side-by-side, heat transfer relationship with respect to each other,
said elongated tubes being interconnected in series with coupling end tubes to form a continuous tubing within the heat exchange portion and through said heat collection portion,
said coupling end tubes which connect the heat exchange portion with the heat collecting portion have an inner cross-section smaller than the inner cross-section of the elongated said continuous tubing section,
said refrigerant being effective to increase in velocity between the heat exchange and neat collecting portions and being directed into each of the elongated, gas expanding segments while absorbing heat available from within said enclosed heat transfer chamber.

16. A system as defined in claim 1 wherein the heat collecting portion includes two, balanced evaporator zones each disposed adjacent opposed sides of the heat exchange portion,
said compressor means is connected to circulate the refrigerant first to the heat exchange portion and then equally divided to each of the two, balanced evaporator zones.

17. A system as defined in claim 16 wherein said compressor means has an inlet side and an outlet side,
said closed circuit means includes an accumulator means connected to the inlet side of the compressor means and pressure regulating value means connected to the accumulator.

18. A system as defined in claim 16 or 17 wherein said closed circuit means includes closed conduit means coupled at one end to the outlet side of the compressor means and connected at the other end thereof to the inlet of the compressor means.

19. A system as defined in claim 18 wherein said closed conduit means comprises continuous tubing.

20. A system as defined in claim 19 wherein said continuous tubing defining the heat exchange portion and the heat collecting portion,
said heat transfer chamber includes a primary heat exchange section which contains said heat exchange portion of the continuous tubing and a heat transfer medium surrounding said heat exchange portion,
said heat exchange portion including an initial heat transfer zone and a superheat transfer zone,
said heat removing means being located in the primary heat exchange section ahd being surrounded by said heat transfer medium to receive heat being transferred from said heat exchange portion.

21. A system as defined in claim 20 wherein each said evaporator zone includes an auxillary super-heat region and a heat absorbing region,
said heat absorbing and superheat regions being connected to increase the velocity of the refrigerant between said regions,
said refrigerant giving up heat in the auxiliary superheat region and reabsorbing said heat in said heat absorbing region into which heat absorbing region the refrigerant is directed at high velocity and under expanding conditions,
said heat absorbing region including a gas expanding segment where the refrigerant expands at reduced velocity while subjected to the heat obtained from the refrigerant passing through the auxiliary superheat region.

22. A system as defined in claim 18 wherein said heat collecting portion has gas expanding segments in which the refrigerant expands in the presence of heat located within the heat transfer chamber whereby the expanded gas absorbs heat before being introduced at the inlet side of the compressor means.

23. A system as defined in claim 22 wherein said heat collecting portion includes a plurality of elongated tubes juxtaposed in side-by-side, heat transfer relationship with respect to each other, said elongated tubes being interconnected in series with coupling end tubes to form a continuous tubing section through said heat collecting portion, said coupling end rubes which connect the heat exchange portion to the heat collecting portion have an inner cross-section smaller than the inner cross-section of the elongated tubes which form gas expanding segments along said continous tubing section, said refrigerant being effective to increase in velocity between the heat exchange and heat collecting portions and being directed into each of the elongated, gas expanding segments from smaller cross-sectioned coupling end tubes while absorbing heat available from within said enclosed heat transfer chamber.

24. A self contained heating system comprising:
(a) closed circuit means containing a refrigerant,
(b) means defining an enclosed heat transfer chamber,
(c) said closed circuit means including a heat exchange portion, a heat collecting portion and compressor means,
(d) said heat exchange portion and said heat collecting portion being disposed within the heat transfer chamber,
(e) said refrigerant being superheated in said heat exchange portion,
(f) said heat collecting portion being effective to collect heat from the superheated refrigerant only from within the heat transfer chamber, and
(g) means for removing heat from the heat exchange portion,
(h) said closed circuit means includes a plurality of elongated tubes juxtaposed in side-by-side relationship with respect to each other to form a bank of tubes,
(i) said bank of tubes having a center bank subsection of elongated tubes and two outer bank subsections of elongated tubes,
(j) said outer bank subsections being disposed on opposite sides of the center bank subsection of elongated tubes,
(k) the elongated tubes in said center bank subsection being interconnected in series with coupling end tubes to form a first continuous tubing section through said heat exchange portion,
(l) the elongated tubes in each of the two respective outer bank subsections being interconnected in series with coupling end tubes to form second continuous tubing sections through said heat collecting portion thereby having two, balanced evaporator zones, each disposed adjacent opposed sides of said heat exchange portion,
(m) said center bank subsection of elongated tubes being interconnected in series with the two outer bank subsections by divider coupling means for directing equal amounts of refrigerant from the center bank subsection to the two respective outer bank subsections which form the two, balanced evaporator zones,
(n) said compressor means has an inlet side and an outlet side and is connected to circulate the refrigerant from said outlet side first to the heat exchange portion in said center bank subsectionand then equally divided to each of the two, balanced evaporator zones.

25. A system as defineo in claim 24 wherein said closed circuit means includes an accumulator means connected to the inlet side of the compressor means and pressure regulating valve means connected to the accumulator.

26. A system as defined in claim 24 or 25 wherein said enclosed heat transfer chamber includes a primary heat exchange section which contains said center bank subsection including said heat exchange portion of the closed circuit means, said heat removing means includes a plurality of elongated tubes connected in series in said center bank subsection to form a continuous heat removing tube section for transferring heat to a fluid medium circulated through said continuous heat removing tube section.

27. A system as defined in claim 26 wherein said heat transfer chamber includes container means disposed around the center bank subsection and filled with a heat transfer medium.

28. A system as defined in claim 27 wherein each said evaporator zone has a first set of elongated tubes defining an auxiliary superheat region, a second set of elongated tubes defining a heat absorbing region.

29. A system as defined in claim 28 wherein said divider coupling means connects said auxiliary superheat region to the heat exchange portion and has an inner cross-section smaller than the inner cross-section of the tubes in the center bank subsection.

30. A system as defined in claim 28 wherein the first set of elongated tubes is connected to the second set of tubes with coupling tube means having an inner cross-section smaller than the inner cross-section of the tubes in the outer bank subsections.

31. A system as defined in claim 1 wherein said transfer chamber defining means comprises an insulated housing and a primary heat exchange section having a top and a bottom and containing a heat transfer medium therein, said compressor means has an inlet side and an outlet side, said heat exchange portion of the closed circuit means is located at the bottom of the heat exchange section and heat removing means is located at the top of the heat exchange section.

32. A system as defined in claim 31 wherein the heat exchange portion includes an initial heat transfer zone at a lower position in the heat exchange section and a superheat transfer zone at an intermediate position.

33. A system as defined in claim 32 wherein the heat collecting portion includes an auxiliary superheat region to receive superheated refrigerant circulated from the superheat transfer zone, the heat collecting portion further includes a heat absorbing region for further expanding the refrigerant after passing through the auxiliary superheat region to absorb heat in the expanded refrigerant, said heat being absorbed as being transferred from said superheat region of the collecting portion, said closed circuit means includes means for directing the expanded refrigerant with heat absorbed therein to the inlet side of the compressor means.

34. A system as defined in claims 31, 32, or 33 wherein
said closed circuit means includes a bank of a plurality of elongated tubes juxtaposed in side-by-side parallel relationship with respect to each other,
said bank of tubes being interconnected at the ends thereof to form a continuous tubing,
a first part of the bank defines a primary heat exchange zone, a second part of the bank defines a superheating zone, a third part of the bank defines an auxiliary superheating zone, a fourth part of the bank defines an evaporator zone.

35. A system as defined in claim 34 wherein
the first, second and third parts of the bank are located in a heat exchange section of the heat transfer chamber, and
the heat exchange section is filled with a heat exchange medium.

36. A system as defined in claim 34 wherein
the tubes in the fourth part of the bank are interconnected with the second part of the bank by coupling tubes having an inner cross-section smaller than the inner cross-section of the elongated tubes to form a gas velocity increasing segment along said continuous tubing.

37. A system as defined in claim 34 wherein
the fourth part of the bank comprises two outer bank subsections forming two, balanced regions in the evaporator zone,
said two outer bank subsections of the fourth part being disposed on opposite sides of the heat exchange section and being interconnected in series with the second part of the bank by divider coupling means for directing equal amounts of superheated refrigerant from the superheating zone to the two, balanced regions of the evaporator zone.

38. A system as defined in claim 37 wherein
each of the two bank subsections includes a first set of elongated tubes connected to a second set of elongated tubes with coupling tube means having an inner cross-section smaller than the inner cross-section of the tubes in the outer bank subsections.

39. A system as defined in claim 38 wherein
said closed circuit means includes an accumulator means connected to the inlet side of the compressor means and pressure regulating means connected to the accumulator,
said second set of elongated tubes being connected to the pressure regulating means.

40. A system as defined in claim 34 wherein
the first part of the bank is connected to the second part of the bank with a coupling tube means having an inner cross-section that is smaller than the inner cross-section of the elongated tubes.

41. A self-contained heating system comprising:
(a) compressor means having an inlet side and an outlet side,
(b) conduit means connected at one end thereof to the outlet side of the compressor means and connected at the other end thereof to the inlet side of the compressor means to form a closed circuit,
(c) said conduit means including a primary heat exchange portion and a heat collecting portion,
(d) said closed circuit contains a refrigerant which is driven around the circuit by the compressor means,
(e) means defining a heat transfer chamber being closed with respect to ambient surroundings,
(f) said heat collecting portion including means to collect heat from within the heat transfer chamber without the necessity of drawing any heat from any ambient source externally disposed with respect to the heat transfer chamber and
(g) means for removing heat from the primary heat exchange portion.

42. A self-contained heating system comprising:
(a) a closed circuit means containing a refrigerant effective to function at high velocities and under high pressures,
(b) said closed circuit means including a first heat exchange portion, a second heat collecting portion and compressor means for circulating the refrigerant within the closed circuit means, said compressor means having an inlet side and an outlet side,
(c) means defining a heat transfer chamber being closed with respect to ambient surroundings and having a primary heat exchange section and an evaporator section,
(d) said first heat exchange portion being located in the primary heat exchange section and including means to superheat the refrigerant therein,
(e) said second heat collecting portion being located in the evaporator section and being effective to absorb heat only from within the heat transfer chamber,
(f) said absorbed heat is transferred to the superheated refrigerant within the heat collecting portion and directed to the inlet side of the compressor means, and
(g) means for removing heat from the primary heat exchange section.

43. A method of generating heat comprising the steps of:
(a) circulating a refrigerant through a closed circuit having a compressing zone, a heat transfer zone, a flash liquid zone, a liquid zone and a heat absorbing evaporator zone, said closed circuit being enclosed with respect to ambient surroundings,
(b) maintaining a predetermined temperature with the flash liquid zone to heat the refrigerant as it circulates through the closed circuit,
(c) compressing the refrigerant while in a heated gaseous state to raise the refrigerant to a further elevated temperature,
(d) directing the heated, gaseous refrigerant from the compressing zone to the heat transfer zone to transfer heat from the refrigerant to a heat transfer zone to transfer heat from the refrigerant to a heat transfer medium,
(e) directing the refrigerant in a restricted flow from the heat transfer zone into the flash liquid zone within which zone the refrigerant absorbs heat energy from the heat transfer medium,
(f) directing a restricted flow of the refrigerant with the absorbed heat energy from the flash liquid zone into a heat transfer relationship with the heat absorbing evaporator zone,
(g) transferring heat from the flash liquid zone to the heat absorbing evaporator zone while directing the refrigerant to the liquid zone,
(h) expanding the refrigerant into the gaseous state from the liquid zone into the heat absorbing evaporator zone which is receiving heat only from the flash liquid zone, and
(i) directing the heated, gaseous refrigerant to the compressing zone to repeat the cycle.

44. A method as defined in claim 43 wherein the heat transfer medium includes a medium used to heat an environment outside the closed circuit.

45. A method as defined in claim 43 wherein the pressure within the closed circuit is regulated between the heat absorbing evaporator zone and the compressing zone.

46. A method as defined in claim 45 wherein the pressure regulating step includes accumulating an enlarged volume of heated, gaseous refrigerant ahead of the compressing zone.

47. A method of generating heat comprising the steps of:
   (a) circulating a refrigerant through a closed circuit having a gas compressing zone, a heat transfer zone, a condensing zone and an evaporator zone wherein said circuit is enclosed with respect to ambient surroundings,
   (b) said condensing zone being in heat transfer relationship with respect to the evaporator zone, and
   (c) maintaining the refrigerant in said condensing zone at a temperature sufficient to give up heat to the refrigerant being circulated through the evaporator zone,
   (d) said heat being absorbed by the refrigerant in the evaporator zone being effective to produce heated gaseous refrigerant to be supplied to the compressing zone,
   (e) said heat being given up by the refrigerant in the condensing zone being effective to preclude the necessity of drawing any heat from any other source outside the enclosed circuit.

48. A method as defined in claim 47 wherein the flow of refrigerant from the condensing zone to the evaporator zone is restricted to increase the velocity of the refrigerant before entering the evaporator zone which is defined by an expansion chamber.

49. A method of generating heat comprising:
   (a) providing closed circuit means including a refrigerant circulated by compressor means having an inlet side and an outlet side,
   (b) providing a heat exchange section filled with a heat transfer medium wherein said heat exchange section is enclosed with respect to ambient surroundings,
   (c) maintaining the heat transfer medium at a predetermined temperature to heat the refrigerant being circulated,
   (d) directing refrigerant from the outlet side of the compressor means to a superheating zone to form a superheated refrigerant which receives heat from the heat transfer medium,
   (e) directing the superheated refrigerant to a gas expanding evaporator zone where heat given off by the superheated refrigerant between the superheating zone and the evaporator zone is absorbed by refrigerant being directed through said gas expanding evaporator zone which gas expanding evaporator zone is enclosed with respect to ambient surroundings, and
   (f) directing said heat absorbing refrigerant to the inlet side of the compressor means.

50. In a closed circuit heating system having a refrigerant circulated by compressor means through condenser means and evaporator means, the combination comprising:
   (a) housing means defining a heat transfer chamber in which the evaporator means is enclosed with respect to ambient surroundings to draw heat from within the chamber without the necessity of drawing heat from any other source outside the chamber,
   (b) means for increasing the amount of heat energy in evaporated refrigerant to superheat said evaporated refrigerant within the evaporator means using only heat developed in the chamber around the enclosed evaporator means, and
   (c) means for introducing the heated evaporator gas into the compressor means to raise the temperature of the evaporated gas discharging from the compressor means.

51. The combination as defined in claim 50 wherein the introducing means includes pressure regulating means effective to produce a back pressure in the condenser means and evaporator means.

52. A method of generating heat comprising:
   (a) circulating a refrigerant through a closed circuit having a compressing zone, a heat transfer zone, a condenser zone and an evaporator zone wherein the heat transfer, condenser and evaporator zones are enclosed with respect to ambient surroundings,
   (b) increasing the amount of heat energy in the refrigerant while it is in the heat transfer zone,
   (c) condensing the refrigerant to release heat energy from the refrigerant,
   (d) receiving the heat energy released from the condensing step into the evaporator zone,
   (e) expanding the refrigerant in the evaporator zone to absorb said released heat energy, and
   (f) directing expanded evaporated refrigerant containing said released heat energy from the evaporator zone to the compressing zone.

53. A self-contained heating system comprising:
   (a) a first closed circuit means containing a refrigerant;
   (b) a second closed circuit means containing a first heat transfer medium and including an energy stabilizing chamber, an evaporator chamber and means to convey the first heat transfer medium between the energy stabilizing and evaporator chambers, and
   (c) a third closed circuit means containing a second heat transfer medium;
   (d) the first closed circuit means including a heat exchange portion, a heat collection portion, and compressor means;
   (e) the heat exchange portion being disposed within the second heat transfer medium to transfer heat from the refrigerant to the second heat transfer medium;
   (f) the heat collecting portion being disposed in the first heat transfer medium.

54. A system as defined in claim 53 wherein the heat collecting portion includes a flash liquid zone located within the energy stabilizing chamber and an evaporator zone located within the evaporator chamber.

55. A system as defined in claim 53 wherein the heat collecting portion includes means for superheating flash liquid within the energy stabilizing chamber and means for superheating evaporated refrigerant within the evaporator chamber.

56. A system as defined in claim 53 wherein the means to convey the first heat transfer medium includes means for balancing the temperature of the first heat transfer medium with respect to the heat stabilizing and evaporator chambers.

57. In a closed circuit heating system having a refrigerant circulated in a closed conduit by compressor means through a heat exchange means and evaporator means, the combination comprising:
- (a) first housing means containing a first heat transfer medium through which the refrigerant is directed by the compressor means in the conduit to give up heat to the heat transfer medium,
- (b) said conduit including means for expanding the refrigerant within the first heat transfer medium to absorb heat from said heat transfer medium to superheat the refrigerant, and
- (c) second housing means including said evaporator means and containing another heat transfer medium through which the superheated refrigerant is directed after the refrigerant has given up heat within the first housing means so that said another heat transfer medium provides additional heat to said superheated refrigerant.

58. In a heating system as defined in claim 57 wherein said second housing means defines a heat transfer chamber enclosed with respect to ambient surroundings to draw heat from within the chamber without the necessity of drawing heat from any other source outside the chamber.

* * * * *